UNITED STATES PATENT OFFICE.

LAMBERT THORP, OF DETROIT, MICHIGAN, ASSIGNOR TO PARKE, DAVIS & COMPANY, OF DETROIT, MICHIGAN, A CORPORATION OF MICHIGAN.

ANESTHETIC BODIES.

1,193,634.      Specification of Letters Patent.      Patented Aug. 8, 1916.

No Drawing.      Application filed April 24, 1916. Serial No. 93,302.

*To all whom it may concern:*

Be it known that I, LAMBERT THORP, a citizen of the United States of America, residing at Detroit, in the county of Wayne and State of Michigan, have invented certain new and useful Improvements in Anesthetic Bodies, of which the following is a specification.

The invention relates to the manufacture of synthetic bodies having anesthetic properties resembling cocaine.

It is the object of the invention to obtain a new body or series of bodies, which, while possessing strong anesthetic properties, are of a less toxic nature than the cocaine—viz. the mono-salts of the esters of 1.3-tetraalkyl-diamino-2-hydroxypropane, and which may be represented by the formula:

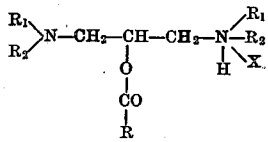

in which $R_1$ and $R_2$ are alkyl groups which may be the same or different. R is any aryl group. X is a halogen atom.

I have found that the mono-salts of the esters of 1.3-tetraalkyl-diamino-2-hydroxypropane may be obtained by the action of an acid chlorid upon a 1.3-tetraalkyl-diamino-2-hydroxypropane in the presence of any inert solvent, such as acetone. The compounds, thus obtained, hitherto unknown, are valuable for medicinal purposes as local anesthetics.

The mono-salts of the esters of 1.3-tetraalkyl-diamino-2-hydroxypropane are colorless, crystalline compounds, soluble in water or alcohol, very slightly soluble in ether or benzene, and of faintly alkaline reaction toward litmus. Upon heating with acids or alkalis the mono-salts of the esters of 1.3-tetraalkyl-diamino-2-hydroxypropane are decomposed with formation of an organic acid and 1.3-tetraalkyl-diamino-2-hydroxypropane, while the addition of potassium carbonate to aqueous solutions of the said mono-salts causes a precipitation of the oily esters of 1.3-tetraalkyl-diamino-2-hydroxypropane. To prepare the said new mono-salts of the esters of 1.3-tetraalkyl-diamino-2-hydroxypropane, the process may be carried out, for instance, as follows:—

(1.) Twenty parts, by weight, of 1.3-tetraethyl-diamino-2-hydroxypropane are dissolved in one hundred parts, by weight, of acetone, and to this solution fourteen parts, by weight, of benzoyl chlorid are gradually added. The solution soon, more especially upon being cooled, deposits the mono-hydrochlorid of the benzoyl ester of 1.3-tetraethyl-diamino-2-hydroxypropane in the form of white, prismatic crystals, soluble in water and, after recrystallization from acetone, having a melting-point of 130° centigrade. From an aqueous solution of the said mono-hydrochlorid a solution of potassium carbonate precipitates as an oil the free base, namely, the benzoyl ester of 1.3-tetraethyl-diamino-2-hydroxypropane.

(2.) In the same way, from fifteen parts of para-toluyl chlorid and twenty parts of 1.3-tetraethyl-diamino-2-hydroxypropane dissolved in one hundred parts of acetone, the mono-hydrochlorid of the toluic ester of 1.3-tetraethyl-diamino-2-hydroxypropane was produced. This mono-salt is slightly more soluble in water than the corresponding benzoic ester and in general resembles very closely, with respect to its chemical and physical properties, the corresponding mono-salt of the benzoic ester, described above. The melting-point of the said mono-hydrochlorid of the toluic ester is 149° centigrade.

(3.) By a similar method, employing fifteen parts of benzoyl chlorid and twenty parts of 1-methyl-ethyl-amino-3-methyl-ethyl-amino-2-hydroxypropane, dissolved in one hundred parts of acetone, the mono-hydrochlorid of the benzoic ester of 1-methyl-ethyl-amino-3-methyl-ethyl-amino-2-hydroxypropane was obtained in the form of white crystals soluble in water and having a melting-point of 190° centigrade.

In an analogous or different manner other mono-salts of the esters of 1.3-tetraalkyl-diamino-2-hydroxypropane may be obtained.

What I claim as my invention is:—

1. As new products, the mono-salts of the esters of 1.3-tetraalkyl-diamino-2-hydroxypropane, being colorless, crystalline compounds, soluble in water or alcohol, very slightly soluble in ether or benzene, of faintly alkaline reaction to litmus, decomposed when heated with acids or alkalis with formation of an organic acid and 1.3-tetraalkyl-diamino-2-hydroxypropane, yielding a precipitate of the oily esters of 1.3-tetraalkyl-diamino-2-hydroxypropane when treated in aqueous solution with potassium carbonate, and displaying a local anesthetic action.

2. As a new product, the mono-hydrochlorid of the benzoic ester of 1.3-tetraethyl-diamino-2-hydroxypropane, being a colorless, crystalline compound, melting at 130° centigrade, soluble in water or alcohol, very slightly soluble in ether or benzene, of faintly alkaline reaction to litmus, decomposed when heated with hydrochloric acid or sodium hydroxid solution into benzoic acid and 1.3-tetraethyl-diamino-2-hydroxypropane, yielding a precipitate of the oily ester, namely, the benzoic ester of 1.3-tetraalkyl-diamino-2-hydroxypropane when treated in aqueous solution with potassium carbonate, and displaying a local anesthetic action.

In testimony whereof I affix my signature in the presence of two witnesses.

LAMBERT THORP.

Witnesses:
F. C. ALEXANDER,
CLIFTON H. BRIGGS.